(12) United States Patent
Lo

(10) Patent No.: US 11,109,674 B1
(45) Date of Patent: Sep. 7, 2021

(54) SIDE PLATE FIXTURE OF RACK FOR BUILDING BLOCK CONTAINERS

(71) Applicant: Ten Square Inc, Deer Park, NY (US)

(72) Inventor: Feng-Jung Lo, Deer Park, NY (US)

(73) Assignee: Ten Square Inc., Deer Park, NY (US)

( * ) Notice: Subject to any disclaimer, the term of this patent is extended or adjusted under 35 U.S.C. 154(b) by 0 days.

(21) Appl. No.: 17/098,637

(22) Filed: Nov. 16, 2020

(51) Int. Cl.
*A47B 87/02* (2006.01)
*F16B 5/02* (2006.01)

(52) U.S. Cl.
CPC ............ *A47B 87/0215* (2013.01); *F16B 5/02* (2013.01)

(58) Field of Classification Search
CPC . A47B 87/02; A47B 87/0223; A47B 87/0253; A47B 87/0125; A47B 87/0276; A47B 87/0246; A47B 2230/0018; A47B 87/0207; Y10T 403/65; Y10T 403/7045; F16B 5/02
See application file for complete search history.

(56) References Cited

U.S. PATENT DOCUMENTS

| | | | | |
|---|---|---|---|---|
| 762,529 A * | 6/1904 | Hodges | ............ | A47B 87/02 312/108 |
| 764,839 A * | 7/1904 | Casler | ............ | A47B 87/02 312/107 |
| 1,216,465 A * | 2/1917 | Lawton | ............ | A47B 87/02 312/108 |
| 1,589,198 A * | 6/1926 | McComb | ............ | A47F 5/12 211/150 |
| 2,048,380 A * | 7/1936 | Hansen | ............ | E05D 7/009 16/387 |
| 3,355,195 A * | 11/1967 | Umekichi | ............ | E04G 1/151 403/364 |
| 3,368,856 A * | 2/1968 | Tisdall | ............ | A47B 87/02 312/111 |
| 3,695,190 A * | 10/1972 | Bucholz | ............ | A47B 87/02 108/91 |
| 3,974,917 A * | 8/1976 | Waxmanski | ............ | A47F 7/08 211/36 |
| D254,887 S * | 5/1980 | Jorda-Segui | ............ | D6/675.1 |
| 4,825,601 A * | 5/1989 | Halverson | ............ | A47F 5/0846 211/189 |
| 4,890,953 A * | 1/1990 | Malatesta | ............ | E04B 1/2604 144/354 |
| 5,172,816 A * | 12/1992 | Kline | ............ | A47B 87/0207 211/194 |
| 5,299,690 A * | 4/1994 | Mund | ............ | B42F 7/12 206/503 |

(Continued)

*Primary Examiner* — Jonathan Liu
*Assistant Examiner* — Devin K Barnett
(74) *Attorney, Agent, or Firm* — Karin L. Williams; Alan D. Kamrath; Mayer & Williams PC

(57) ABSTRACT

A side plate fixture includes a plurality of sides plates and a plurality of screw members. Each of the sides plates has a plate body which has a first end provided with a projection and a second end provided with a recess. The projection is provided with a slot and a plurality of through holes. The recess is provided with an insertion piece and a plurality of screw holes. The sides plates are arranged linearly. When two adjacent sides plates are assembled, the projection is inserted into the recess, the insertion piece is inserted into the slot, and the through holes correspond to the screw holes. The screw members extend through the through holes and are screwed into the screw holes, to connect and secure any two adjacent sides plates.

3 Claims, 6 Drawing Sheets

(56) References Cited

U.S. PATENT DOCUMENTS

| | | | | |
|---|---|---|---|---|
| 5,415,297 | A * | 5/1995 | Klein | A47B 81/068 |
| | | | | 108/61 |
| 5,720,134 | A * | 2/1998 | Kurtz | E04H 12/2292 |
| | | | | 256/65.14 |
| 5,992,647 | A * | 11/1999 | Malik | A47B 45/00 |
| | | | | 211/194 |
| 6,321,918 | B1 * | 11/2001 | Rollins | A47B 87/0207 |
| | | | | 211/194 |
| D462,539 | S * | 9/2002 | Segall | D6/681.1 |
| 6,732,858 | B1 * | 5/2004 | Chang | A47B 87/0276 |
| | | | | 206/278 |
| 7,762,406 | B2 * | 7/2010 | Qiang | A47B 61/04 |
| | | | | 211/38 |
| 9,820,572 | B1 * | 11/2017 | Kuehn | A47B 87/001 |
| 10,273,677 | B2 * | 4/2019 | Green | F16B 7/042 |
| D914,410 | S * | 3/2021 | Lo | D6/675.3 |
| 2003/0010738 | A1 * | 1/2003 | Hsia | A47B 87/007 |
| | | | | 211/188 |
| 2004/0118791 | A1 * | 6/2004 | Rimback | A47F 7/08 |
| | | | | 211/34 |
| 2006/0152114 | A1 * | 7/2006 | Yamada | A47B 87/02 |
| | | | | 312/107 |
| 2011/0272542 | A1 * | 11/2011 | Wojtowicz | A47F 5/14 |
| | | | | 248/218.4 |
| 2015/0196121 | A1 * | 7/2015 | Chan | A45C 7/0045 |
| | | | | 312/107 |
| 2015/0320207 | A1 * | 11/2015 | Chan | A47B 87/0276 |
| | | | | 312/108 |
| 2016/0144912 | A1 * | 5/2016 | Greenblatt | B62H 3/06 |
| | | | | 211/5 |
| 2018/0146777 | A1 * | 5/2018 | Henonin | A47B 87/0246 |

* cited by examiner

SIDE PLATE FIXTURE OF RACK FOR BUILDING BLOCK CONTAINERS

BACKGROUND OF THE INVENTION

1. Field of the Invention

The present invention relates to a rack or shelf for placing articles and, more particularly, to a side plate fixture of a rack for placing building block containers.

2. Description of the Related Art

A conventional placement rack or shelf is used for placing articles and comprises two side plates and a plurality of rods or planks secured between the side plates. Thus, the articles are placed on and supported by the rods. However, the side plates cannot be expanded, so that the conventional placement rack has a fixed placement space that cannot be adjusted according to the practical requirement.

BRIEF SUMMARY OF THE INVENTION

The primary objective of the present invention is to provide a side plate fixture that is expandable to increase a storage space of a rack for placing building block containers.

In accordance with the present invention, there is provided a side plate fixture comprising a plurality of sides plates and a plurality of screw members connecting the sides plates. Each of the sides plates has a plate body. The plate body has a first end provided with a projection protruding outward. The projection is provided with a slot. The slot and one face of the plate body are directed toward the same direction. The projection is provided with a plurality of through holes. The plate body has a second end provided with a recess. The plate body is provided with an insertion piece in the recess. The insertion piece and the other face of the plate body are directed toward the same direction. The recess is provided with a plurality of screw holes. The sides plates are arranged linearly. The projection of a first one of the sides plates is inserted into the recess of a second one of the sides plates. The insertion piece of the second one of the sides plates is inserted into the slot of the first one of the sides plates. The through holes of the first one of the sides plates correspond to the screw holes of the second one of the sides plates. The screw members extend through the through holes and are screwed into the screw holes, to connect any two adjacent sides plates.

In assembly, two side plate fixtures are arranged symmetrically. A plurality of rods are secured between the two side plate fixtures to construct a rack for placing building block containers. Thus, the building block containers are supported by the rods. Each of the building block containers is used for storing building blocks.

According to the primary advantage of the present invention, the number of the side plate fixture is increased, so that multiple side plate fixtures are assembled to increase the storage space of the rack, thereby facilitating the user storing the building block containers.

According to another advantage of the present invention, any two adjacent sides plates are connected by insertion and screwing, such that the side plate fixture is assembled easily and quickly, thereby facilitating the user assembling the side plate fixture.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
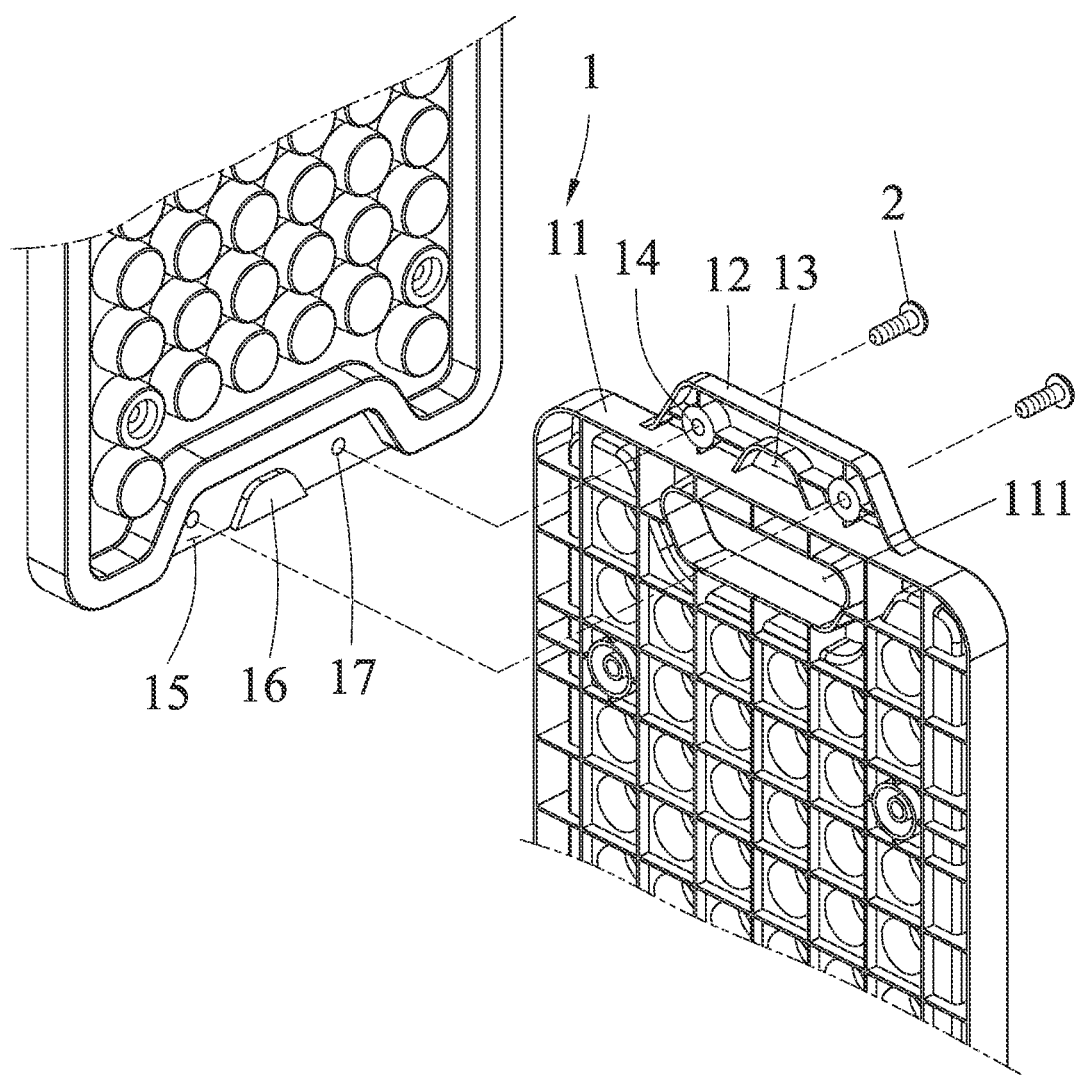
FIG. 1 is an exploded perspective view of a side plate fixture of a rack in accordance with the preferred embodiment of the present invention.
Figure 2:
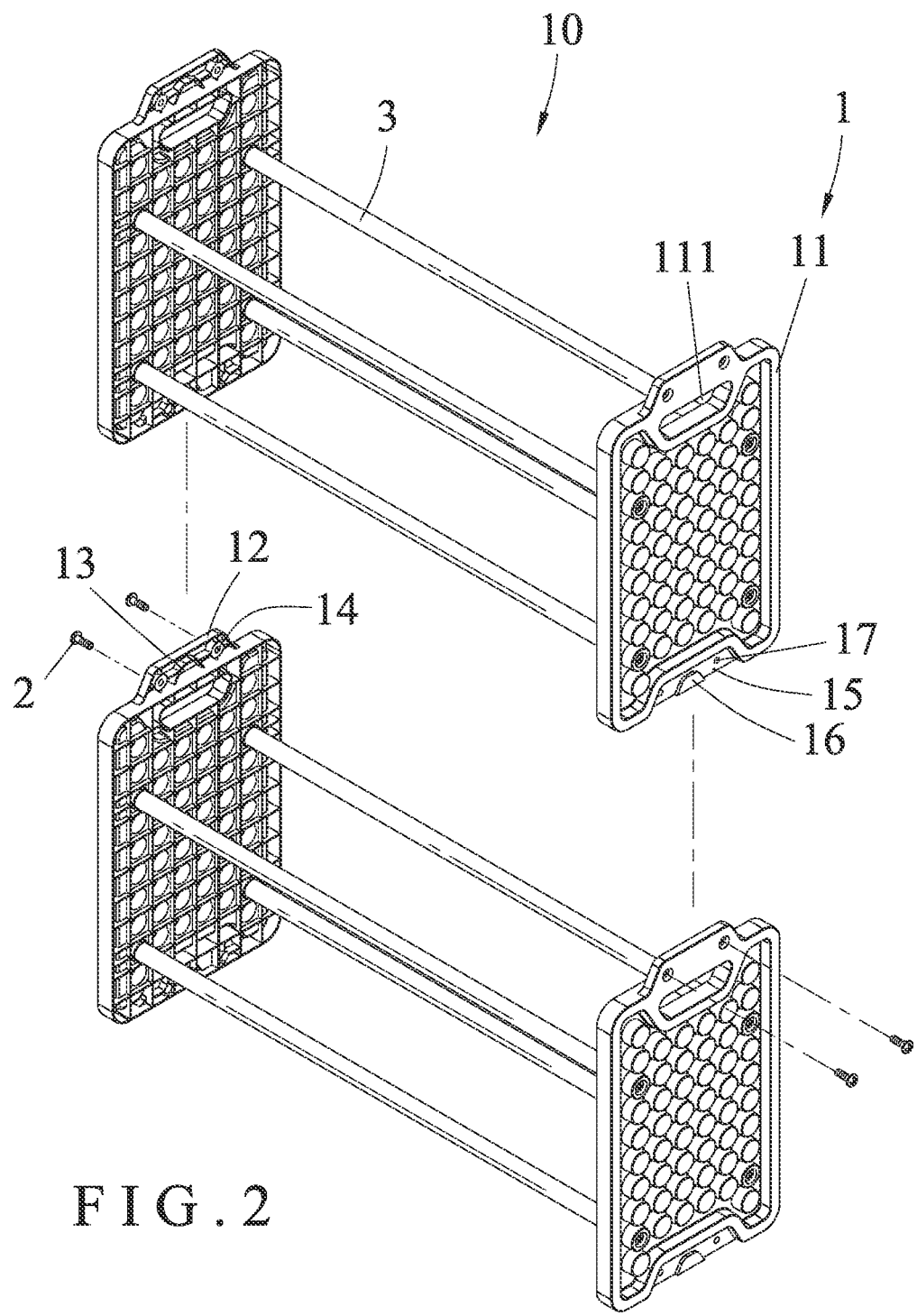
FIG. 2 is a partial exploded perspective view of the rack in accordance with the preferred embodiment of the present invention.
Figure 3:
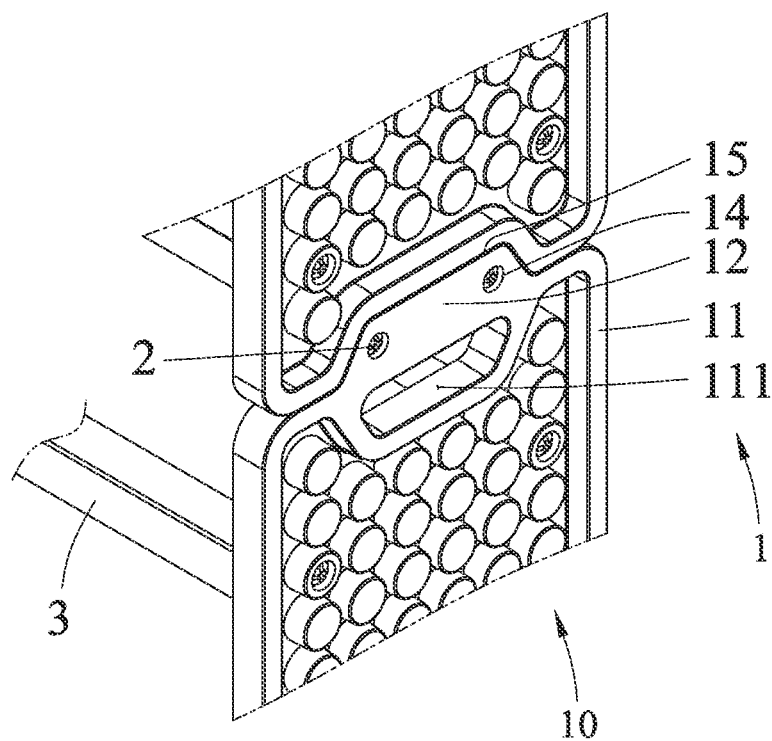
FIG. 3 is a perspective assembly view of the side plate fixture in accordance with the preferred embodiment of the present invention.
Figure 4:
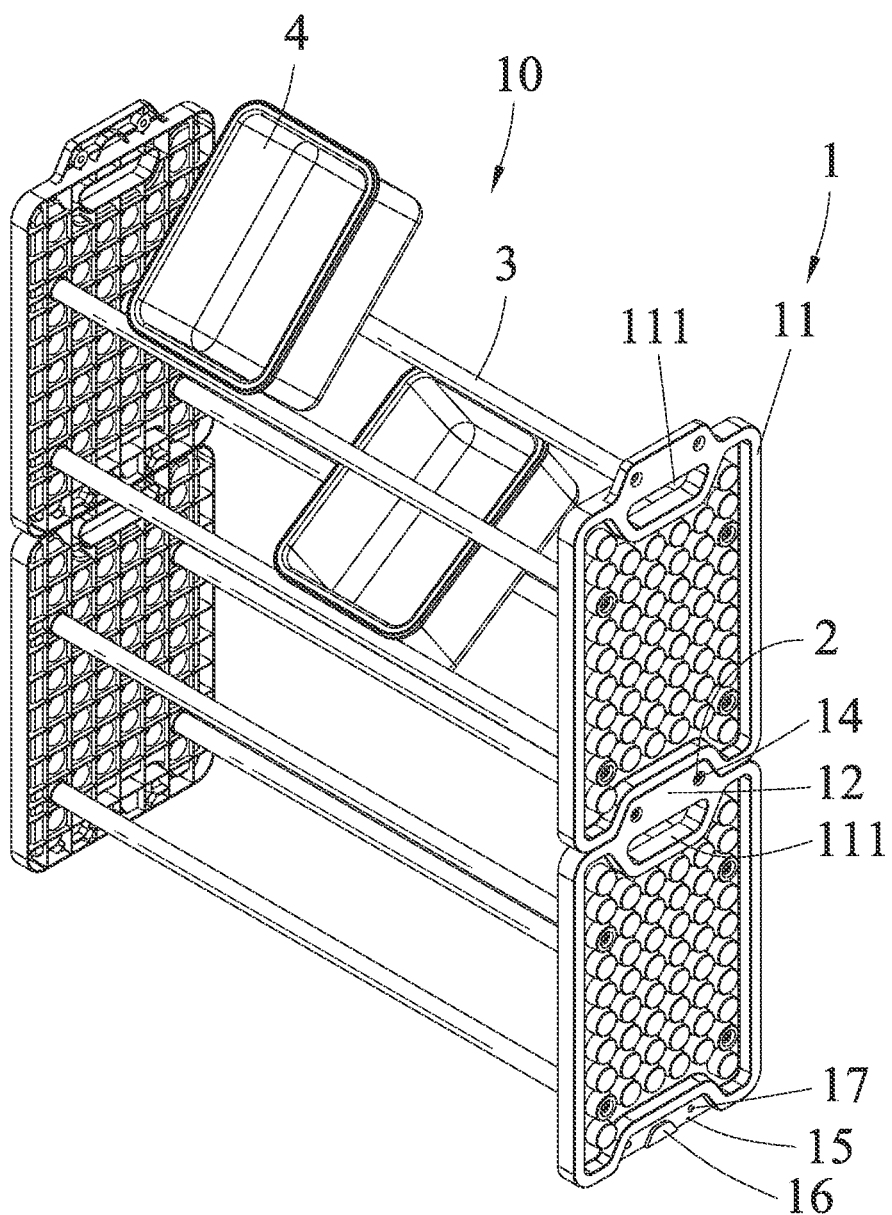
FIG. 4 is a perspective assembly view of the rack for placing building block containers in accordance with the preferred embodiment of the present invention.

Referring to the drawings and initially to FIGS. 1-4, a side plate fixture in accordance with the preferred embodiment of the present invention comprises a plurality of sides plates 1 and a plurality of screw members 2 connecting the sides plates 1.

Each of the sides plates 1 has a plate body 11. The plate body 11 has a first end provided with a projection 12 protruding outward. The projection 12 is provided with a slot 13. The slot 13 and one face of the plate body 11 are directed toward the same direction. The projection 12 is provided with a plurality of through holes 14. The plate body 11 has a second end provided with a recess 15. The plate body 11 is provided with an insertion piece 16 in the recess 15. The insertion piece 16 and the other face of the plate body 11 are directed toward the same direction. The recess 15 is provided with a plurality of screw holes 17.

The sides plates 1 are arranged linearly from bottom to top. The projection 12 of a first one of the sides plates 1 is inserted into the recess 15 of a second one of the sides plates 1. The insertion piece 16 of the second one of the sides plates 1 is inserted into the slot 13 of the first one of the sides plates 1. The through holes 14 of the first one of the sides plates 1 correspond to the screw holes 17 of the second one of the sides plates 1.

The screw members 2 extend through the through holes 14 and are screwed into the screw holes 17, to connect any two adjacent sides plates 1.

In the preferred embodiment of the present invention, the plate body 11 of each of the sides plates 1 is provided with a finger hole 111 which perforates the plate body 11 in the thickness direction thereof.

In the preferred embodiment of the present invention, the projection 12 and the recess 15 have the same cross-sectional shape.

In the preferred embodiment of the present invention, the slot 13 and the insertion piece 16 have the same cross-sectional shape.

In assembly, two side plate fixtures are arranged symmetrically. A plurality of rods 3 are secured between the two side plate fixtures to construct a rack 10 for placing building block containers 4. Thus, the building block containers 4 are supported by the rods 3. Each of the building block containers 4 is used for storing building blocks.

Accordingly, multiple side plate fixtures are assembled to increase the storage space of the rack 10, thereby facilitating the user storing the building block containers 4. In addition, any two adjacent sides plates 1 are connected by insertion and screwing, such that the side plate fixture is assembled easily and quickly, thereby facilitating the user assembling the side plate fixture.

Figure 5:
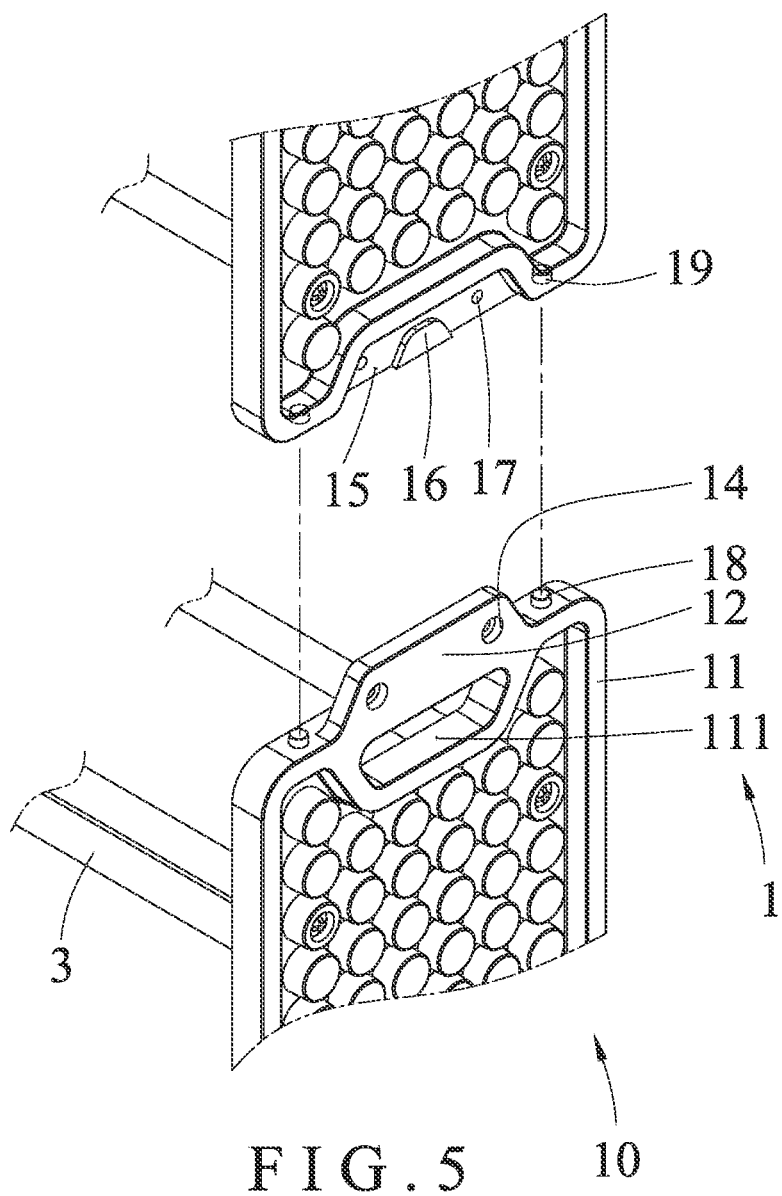
FIG. 5 is an exploded perspective view of a side plate fixture in accordance with another preferred embodiment of the present invention.
Figure 6:
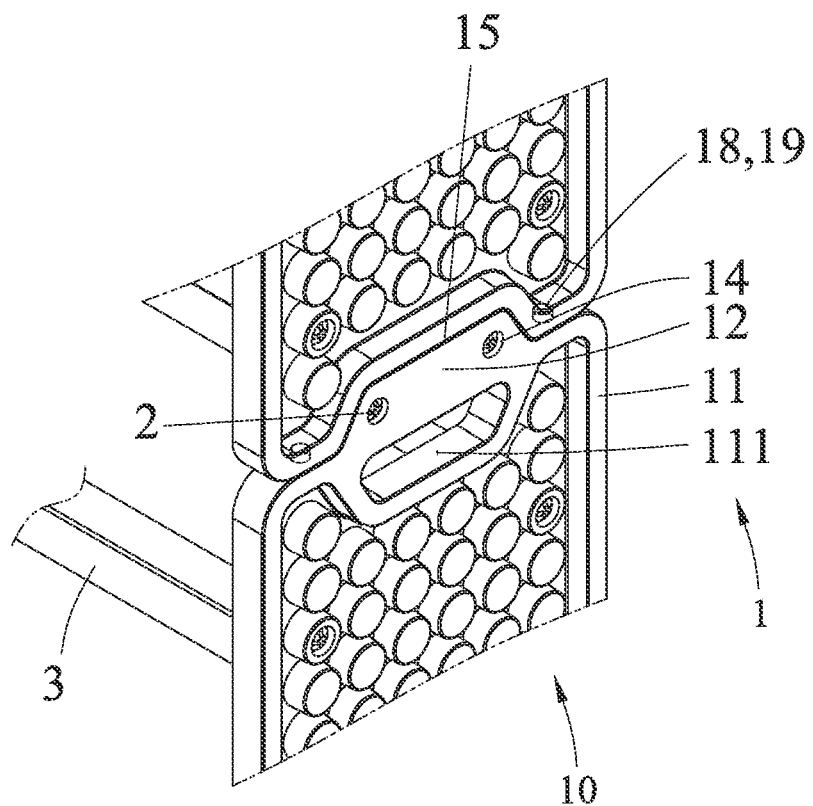
FIG. 6 is a perspective assembly view of the as shown in FIG. 5.

Referring to FIGS. 5 and 6, the first end of the plate body 11 is provided with at least one insert 18, and the second end of the plate body 11 is provided with at least one insert hole 19. The at least one insert 18 of one of the sides plates 1 is inserted into the at least one insert hole 19 of another one of the sides plates 1.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A side plate fixture comprising:
   a plurality of sides plates; and
   a plurality of screw members connecting the sides plates;
   wherein each of the sides plates comprises:
   a plate body having a length and a substantially constant width;
   the plate body has a first end provided with a projection protruding outward therefrom;
   the projection has a length that is smaller than the width of the plate body;
   the projection is provided with a slot;
   the slot and a first face of the plate body are directed toward the same direction;
   the projection is provided with a plurality of through holes;
   the plate body has a second end provided with a recess;
   the plate body is provided with an insertion piece in the recess;
   the insertion piece and a second face of the plate body opposite the first face of the plate body are directed toward the same direction;
   the recess is provided with a plurality of screw holes;
   the side plates are arranged linearly;
   the projection of a first one of the sides plates is inserted into the recess of a second one of the sides plates;
   the insertion piece of the second one of the sides plates is inserted into the slot of the first one of the sides plates;
   the through holes of the first one of the sides plates correspond to the screw holes of the second one of the sides plates; and
   the screw members extend through the through holes and are screwed into the screw holes, to connect respective adjacent sides plates.

2. The side plate fixture as claimed in claim 1, wherein the plate body of each of the sides plates is provided with a finger hole.

3. The side plate fixture as claimed in claim 1, wherein the first end of each plate body is provided with at least one insert, the second end of each plate body is provided with at least one insert hole, and the at least one insert of one of the sides plates is inserted into the at least one insert hole of another one of the sides plates.

* * * * *